United States Patent [19]

Nakane et al.

[11] Patent Number: 4,771,093

[45] Date of Patent: Sep. 13, 1988

[54] RUBBER COMPOSITION

[75] Inventors: Masakazu Nakane; Tatsuya Murachi, both of Aichi, Japan

[73] Assignee: Toyoda Gosei Co., Ltd., Nishikasugai, Japan

[21] Appl. No.: 37,112

[22] Filed: Apr. 10, 1987

Related U.S. Application Data

[63] Continuation of Ser. No. 826,013, Feb. 4, 1986, abandoned.

[30] Foreign Application Priority Data

| Feb. 5, 1985 | [JP] | Japan | 60-20645 |
| Mar. 1, 1985 | [JP] | Japan | 60-41709 |
| Dec. 14, 1985 | [JP] | Japan | 60-281529 |

[51] Int. Cl.$^4$ ............................................. C08K 5/41
[52] U.S. Cl. ................................................. 524/225
[58] Field of Search ............................... 524/225, 519

[56] References Cited

U.S. PATENT DOCUMENTS

| 2,262,092 | 11/1941 | Buffington | 524/519 |
| 2,416,668 | 3/1947 | Schroeder | 524/225 |
| 2,472,112 | 11/1947 | Leatherman | 524/225 |
| 2,758,103 | 8/1956 | Henson et al. | 524/225 |
| 4,017,668 | 4/1977 | Freedman et al. | 524/225 |
| 4,300,970 | 11/1981 | Honda et al. | 428/492 |

FOREIGN PATENT DOCUMENTS

| 136543 | 3/1947 | Australia . |
| 151517 | 7/1951 | Australia . |
| 206416 | 6/1956 | Australia . |
| 11299 | 2/1976 | Australia . |
| 83654 | 5/1982 | Australia . |

Primary Examiner—Joseph L. Schofer
Assistant Examiner—N. Sarofin
Attorney, Agent, or Firm—Cushman, Darby & Cushman

[57] ABSTRACT

The rubber composition of the present invention comprises rubbers and halogen compounds. As the rubbers, vulcanized or unvulcanized rubbers are employed. The vulcanized rubber compositions are obtained by applying unvulcanized rubbers together with the halogen compounds, vulcanizing agents and vulcanization accelerators to subjects to be coated and then heating them. These rubber compositions all exhibit a strong adhesive force to various rubbers and therefore, they are useful as adhesives or subbing agents for various rubbers including vulcanized polyolefin rubbers.

4 Claims, 1 Drawing Sheet

RUBBER COMPOSITION

This is a continuation of application Ser. No. 826,013, filed Feb. 4, 1986, which was abandoned upon the filing hereof.

BACKGROUND OF THE INVENTION

1. Field of the Invention

The present invention relates to rubber compositions having strong adhesive force to various rubbers including vulcanized polyolefin rubbers and, adhesives as well as primers comprising the rubber compositions.

2. Description of the Related Art

As rubbers for industrial use, various synthetic rubbers such as polyolefin rubber, styrene-butadiene copolymer rubber (SBR), polybutadiene rubber (BR), isobutylene-isoprene copolymer rubber (IIR), polychloroprene rubber (CR), acrylonitrile-butadiene copolymer rubber (NBR), polyisoprene rubber (IR), etc. or natural rubber (NR) are employed.

Among them, vulcanized polyolefin rubbers represented by ethylene-propylene-diene terpolymer rubber (EPDM) and ethylene-propylene copolymer rubber (EPM) possess many superior properties that are excellent in weather resistance, aging resistance and resistance to ozon, provide a wide temperature range for use from −50° to 150° C., and the like. Therefore, vulcanized polyolefin rubbers have now been used in many fileds of industry, including rubber parts for automobiles such as weatherstrips, glass run, moldings, etc.

On the other hand, it is known that the aforesaid vulcanized polyolefin rubbers such as EPDM, EPM, etc. contain no polar group in the main chain of the molecule thereof so that even though paints or adhesives are applied to the surface thereof, the resulting coating are liable to be stripped off.

For this reason, it is extremely difficult under the present situations to (1) coat the surface of the vulcanized polyolefin rubbers, (2) adhere the vulcanized polyolefin rubbers to each other and (3) adhere the vulcanized polyolefin rubbers to synthetic resins or metals.

Various measures for overcoming these difficulties have been attempted but no satisfactory solution has not been found yet.

As an example, the aforesaid weatherstrips are used as sealing agents for front or rear reveal portions, door portions or trunk portions, where the weatherstrips are mounted in different manners depending upon place to be used.

Namely, in the case of the trunk portions, a method which comprises mounting weatherstrips obtained by previously extrusion-molding, coating adhesives at the edges thereof and adhering, around a trunk opening of the body is adopted.

Further in the case of the reveals, there are adopted a method which comprises subjecting reinforced glass coated with an adhesive and a weatherstrip to one-piece molding, a method which comprises inserting a weatherstrip obtained by previously extrusion-molding and adhering the edges thereof by a vulcanizing adhesion method around reinforced glass, etc.

However, the aforesaid vulcanized polyolefin rubbers such as EPDM, EPM, etc. have poor adhesion to adhesives or paints so that upon coating adhesives at the edges of weatherstrips composed of the vulcanized polyolefin rubbers, various pre-treatments must be made on the surface of the weatherstrip.

However, even though such pre-treatments are made, adhesive property at the adhered portion has come to be actually deteriorated due to the use over a long period of time.

SUMMARY OF THE INVENTION

An object of the present invention is to provide a rubber composition having a strong adhesive force to various rubbers, especially to vulcanized polyolefin rubbers which have a poor adhesive force to paints or adhesives.

Another object of the present invention is to provide an adhesive and a primer having a strong adhesive force to vulcanized polyolefin rubbers.

For achieving these objects, the rubber composition of the present invention comprises a solution or dispersion system containing an unvulcanized rubber and a halogen compound.

These and other objects of the present invention will become apparent from embodiments which will be explained hereinafter and from claims appended. And many advantages which are not mentioned in the specifications will be apparent to those skilled in the art if they practice the present invention.

DETAILED DESCRIPTION OF PREFERRED EMBODIMENTS

Figure 1:
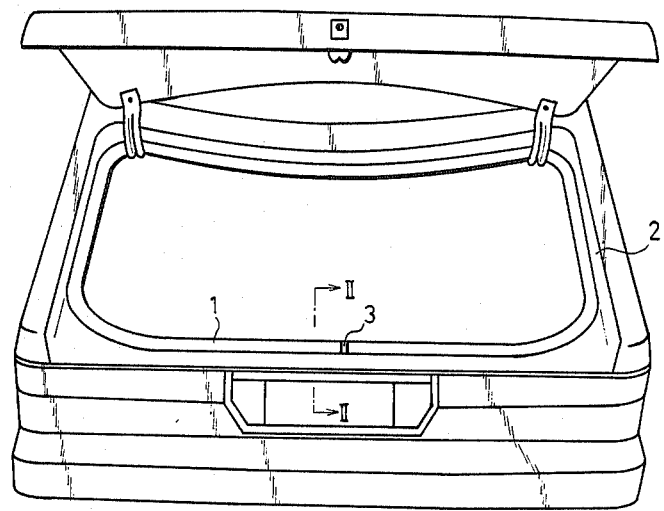
FIG. 1 is a front view of an opening for trunk having mounting weatherstrip comprising EPDM-vulcanized rubber at the peripheral portion thereof and FIG. 2 is a partly enlarged perspective view showing its II—II cross section.

Hereafter the construction of the rubber composition of the present invention will be explained below.

First, the term "rubber" refers to a natural rubber (NR) and a synthetic rubber.

Examples of the synthetic rubber described above include an ethylene-propylene-diene terpolymer rubber (EPDM), an ethylene-propylene copolymer rubber (EPM), a styrene-butadiene copolymer rubber (SBR), a butadiene rubber (BR), an isobutylene-isoprene copolymer rubber (IIR), a chloroprene rubber (CR) and an acrylonitrile-butadiene copolymer rubber (IR).

As the halogen compounds, compounds containing in the molecule thereof a bond:

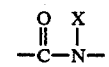

wherein X is halogen, alkyl hypohalides, hypohalogenous acid salts, etc. are most suited.

Specific examples of the compounds containing in the molecule thereof the bond:

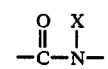

(wherein X is halogen)

include halogenated succinimides such as N-bromosuccinimide, etc.; halogenated isocyanuric acids such as trichloroisocyanuric acid, dichloroisocyanuric acid, etc.; halogenated hydantoins such as dichlorodimethylhydantoin, etc.

The alkyl hypohalides are normal-, secondary or tertiary alkyl hypohalides; inter alia, tertiary alkyl hypohalides such as tertiary butyl or tertiary amyl chlorides or bromides, etc. are preferred.

Examples of the hypohalogenous acid salts include sodium, potassium or calcium hypochlorite or hypobromite.

Next, the vulcanizing agent refers to sulfur, morpholine disulfide, dicumyl peroxide, etc. The vulcanization accelerator refers to N-cyclohexyl-2-benzothiazolyl sulfenamide, 2-mercaptobenzothiazole, zinc dimethyldithiocarbamate, tetramethylthiuramdisulfide, etc.

The rubber composition of the present invention is a solution or dispersion system containing the rubber and the halogen compound exemplified above, or containing them and the vulcanizing agent as well as the vulcanization accelerator.

The solvent used therein includes, when the halogen compounds are those containing in the molecule thereof:

wherein X is halogen, a solvent selected from aromatic hydrocarbons such as benzene, toluene, xylene, etc.; ethers such as dioxane, tetrahydrofuran, etc.; acetates such as ethyl acetate, methyl acetate, isopropyl acetate, etc.; ketones such as methyl ethyl ketone, acetone, cyclohexanone, etc.; and chlorohydrocarbons such as ethyl chloride, chloroform, carbon tetrachloride, etc.; or a solvent mixture of at least two of them. In case that the halogen compounds a hypochlorite, water and known emulsifying agents are used instead of the above-described organic solvents to form the rubber composition of latex type.

Further in the case of the alkyl hypohalide, either the aforesaid solvents or water may be employed.

Next, the ratio of the above-described rubber to the halogen compound is generally 0.01 to 10 parts by weight, preferably 0.01 to 2 parts by weight, of the halogen compound based on 100 parts by weight of the solid content in the rubber. With greater than 10 parts by weight, the rubber composition is gelled and with smaller than 0.01 part by weight, the adhesive force is reduced.

As the halogen compounds, in addition to those disclosed above, there may also be used (1) halogens such as chlorine, bromine, etc. or an aqueous solution thereof, (2) a mixture of a hypohalogenous acid salt and an organic acid (Published Examined Japanese Patent Application No. 52216/82), (3) antimony pentafluoride (Published Unexamined Japanese Patent Application No. 23483/85), (4) a mixture of an aqueous solution of an alkali metal or an alkaline earth metal, sulfur fluoride and bromine (Published Examined Japanese Patent Application No. 27751/78), (5) a mixture of iodine and potassium iodide (Published Examined Japanese Patent Application No. 27751/78), (6) a mixture of a halogenooxyacid salt and conc. hydrochloric acid (Published Examined Japanese Patent Application No. 22103/71), or (7) a mixture of an alkyl bromide and peroxodisulfuric acid.

Also in the case of these halogen compounds, the halogen compounds should be formulated in an amount of 0.01 to 10 parts by weight, preferably 0.01 to 2 parts by weight, based on 100 parts by weight of the solid content in the unvulcanized rubber.

In case that the vulcanizing agent and the vulcanization accelerator described above are further incorporaed, an appropriate amount is that generally incorporated upon vulcanization.

The rubber composition of the present invention may generally contain phenyl-α-naphthylamine, 2,6-di-t-butyl-p-cresol, etc. for purposes of preventing aging of rubber and deterioration due to oxidation and ozon; carbon black, hydrated silicic acid, magnesium carbonate, clay, etc. as fillers; and further as plasticizers, dioctyl sebacate, mineral oils, etc. Suitable amounts of these additives are those generally incorporated in rubber.

Next, a process for producing the rubber composition of the present invention will be explained. Firstly, rubber is added to the aforesaid solvent to prepare a rubber solution. Then, the halogen compound is added to the solution in the aforesaid fixed ratio. If necessary, the aforesaid additives are further added to the solution. In this case, the solution may be heated to 60° to 180° C. for purpose of accelerating the bond between the rubber and the halogen compound.

In case that the vulcanizing agent and the vulcanization accelerator are formulated, the halogen compound is bound to the rubber by the heat treatment and at the same time, the vulcanizing reaction of the rubber proceeds, whereby the rubber composition solidifies. Accordingly, it is preferred that the above-mentioned heat treatment be performed after the rubber composition is coated onto the surface of the rubber to be coated.

The thus obtained rubber composition of the present invention provides high polarity and high reactivity because the halogen is bound to the rubber molecule and exhibits a strong adhesive force to high molecular base materials such as rubbers, synthetic resins, etc.

Accordingly, the rubber composition of the present invention is extremely useful as an adhesive for various rubbers including vulcanized polyolefin rubbers. Further the rubber composition is extremely useful as a primer upon coating paints or adhesives onto various rubbers. Furthermore, pigments or dyestuffs are incorporated into the rubber composition to give paints having a strong adhesive force to various rubbers.

In coating the rubber composition onto the rubber surface, no special equipment is required but coating can be effected in a simple manner by known coating methods such as dipping, brush coating, spray coating, etc.

Further, the rubber composition is of one-pack type so that a usable time period is very long and, when a viscosity increases due to evaporation of a solvent, the solvent may be added again to control the viscosity.

On the other hand, specific examples of the object to which the rubber composition is applied include polyolefin rubbers such as EPDM, EPM, etc. described above, styrenebutadiene copolymer rubbers (SBR), butadiene rubbers (BR), isobutylene-isoprene copolymer rubbers (IIR), chloroprene rubbers (CR), acrylonitrile-butadiene copolymer rubbers (NBR), polyisoprene rubbers (IR) and natural rubbers (NR).

These rubbers may be added with addenda or additives conventionally used, namely, (1) sulfur, morpholine disulfide, dicumyl peroxide, etc. as a vulcanizing agent, (2) 2-metceptobenzothiazole, zinc dimethyldithiocarbamate, tetramethylthiuramdisulfide, etc. as a vulcanization accelerator, (3) phenyl-α-naphthylamine, 2,6-di-t-butyl-p-cresol, etc. as an anti-aging agent, antioxidant or ozon-deterioration preventing agent, (4) carbon black, hydrated silicic acid, magnesium carbonate, clay, etc. as a filler, (5) dioctyl sebacate, a mineral oil, etc. as a plasticizer, etc.

In addition to the rubbers described above, synthetic resins such as ABS resin, styrene resin (PS), polyethylene resin (PE), polypropylene resin (PP), ethylene-vinyl acetate copolymer resin (EVA), etc. can also be the subject to be coated.

Rubber Compositions-A to E shown in Tables 1 to 5 are specific examples of rubber compositions obtained by formulating halogen compunds in rubber solutions (hereafter parts in each table are all by weight).

TABLE 1

| Rubber Composition-A | |
| --- | --- |
| EPDM | 1 part |
| Trichloro-isocyanuric acid | 0.01 |
| n-Hexane | 99 |

TABLE 2

| Rubber Composition-B | |
| --- | --- |
| SBR | 1 part |
| Trichloro-isocyanuric acid | 0.02 |
| n-Hexane | 99 |

TABLE 3

| Rubber Composition-C | |
| --- | --- |
| NR | 1 part |
| Trichloro-isocyanuric acid | 0.02 |
| n-Hexane | 99 |

TABLE 4

| Rubber Composition-D | |
| --- | --- |
| BR | 1 part |
| t-Butyl hypochloride | 0.02 |
| Toluene | 99 |

TABLE 5

| Rubber Composition-E | |
| --- | --- |
| NBR | 1 part |
| t-Butyl hypochloride | 0.02 |
| Toluene | 99 |

Further Rubber Compositions F to J described below are specific examples of the rubber compositions obtained by formulating a halogen compound, a vulcanizing agent and a vulcanizing accelerator in a rubber solution.

TABLE 6

| Rubber Composition-F | |
| --- | --- |
| EPDM | 100 parts |
| Trichloro-isocyanuric acid | 0.05 |
| Zinc oxide | 5 |
| Stearic acid | 1 |
| Carbon black | 70 |
| Process oil | 35 |
| Sulfur | 1.5 |
| N—Cyclohexyl-2-benzothiazolyl-sulfenamide | 1 |

TABLE 6-continued

| Rubber Composition-F | |
| --- | --- |
| n-Hexane | 9900 |

TABLE 7

| Rubber Composition-G | |
| --- | --- |
| SBR | 100 parts |
| Trichloro-isocyanuric acid | 0.05 |
| Zinc oxide | 3 |
| Stearic acid | 1 |
| Carbon black | 35 |
| Process oil | 5 |
| Sulfur | 2 |
| N—Cyclohexyl-2-benzothiazolyl-sulfenamide | 1 |
| Toluene | 9900 |

Rubber Composition-H:

Instead of SBR and trichloroisocyanuric acid in Table 7, 100 parts of NR and 0.01 part of dichloroisocyanuric acid were used, respectively (otherwise identical with Rubber Composition-G).

Rubber Composition-I:

Instead of SBR in Table 7, 100 parts of BR were used and the amount of trichloroisocyanuric acid was changed to 0.02 parts (otherwise identical with Rubber Composition-G).

Rubber Composition-J:

Instead of SBR and toluene in Table 7, 100 parts of NBR and 9900 parts of acetone were used, respectively and further the amount of trichloroisocyanuric acid was changed to 10 parts (otherwise identical with Rubber Composition-G).

Next, for purpose of an adhesive force of each of the above described Rubber Compositions A through J to vulcanized polyolefin rubber, a test shown below was carried out.

Firstly, EPDM formulated shown in Table 8 was vulcanized at 160° C. for 30 minutes to prepare a test piece of 100 mm×20 mm×3 mm thick.

TABLE 8

| EPDM | 100 parts |
| --- | --- |
| Carbon black | 70 |
| Mineral oil | 35 |
| Stearic acid | 1 |
| Vulcanization accelerator | 2 |
| Sulfur | 1.5 |
| Zinc oxide | 5 |

On the other hand, the following rubber compositions were prepared as comparative examples.

COMPARATIVE EXAMPLE 1

To 99 parts by weight of acetone was added 1 part by weight of SBR.

COMPARATIVE EXAMPLE 2

To 99 parts by weight of acetone was added 1 part by weight of NR.

COMPARATIVE EXAMPLE 3

The amount of trichloroisocyanuric acid in Rubber Composition-J was changed to 15 parts (otherwise identical with Rubber Composition-J).

Next, Rubber Composition-A was coated onto the surface of the test piece described above. After allowing to stand for 24 hours at room temperature, the adhesive force of the coating was examined by the square test. Further with respect to Rubber Compositions-B through E and the rubber compositions of Comparative Examples 1 and 2, a similar test was performed.

In addition, Rubber Composition-F was coated onto the surface of the test piece. After allowing to stand for 30 minutes at room temperature, the system was allowed to stand for 15 minutes in the air heated at 150° C. After allowing to stand for 24 hours at room temperature, the adhesive force of the coating was examined by the square test.

Further with respect to Rubber Compositions-G through J and the rubber composition of Comparative Example 3, a similar test was carried out.

The test results are shown in Table 9.

TABLE 9

| Rubber Composition | Square Test |
|---|---|
| A | no stripping (100/100) |
| B | no stripping (100/100) |
| C | no stripping (100/100) |
| D | no stripping (100/100) |
| E | no stripping (100/100) |
| F | no stripping (100/100) |
| G | no stripping (100/100) |
| H | no stripping (100/100) |
| I | no stripping (100/100) |
| J | no stripping (100/100) |
| Comparative Example | |
| 1 | poor adhesion (0/100) |
| 2 | poor adhesion (0/100) |
| 3 | impossible to examine due to gellation |

From the results above, it has become evident that the adhesive force of Rubber Compositions-A through J to EPDM was strong and firm. In the rubber compositions of Comparative Examples 1 and 2, no halogen compound was formulated. Further in the rubber composition of Comparative Example 3, the halogen compound was formulated in an excess amount so that gellation occurred prior to applying to the test piece.

Next, examples using Rubber Compositions-A through J as adhesives for automobile weatherstrips will be explained below.

Firstly, EPDM having the composition shown in Table 10 was extrusion molded. The mold was vulcanized at 200° C. for 5 minutes in a fluidized bed to prepared weatherstrip used for the trunk portion of an automobile.

TABLE 10

| EPDM | 100 parts |
|---|---|
| Carbon black | 80 |
| Mineral oil | 25 |
| Stearic acid | 1 |
| Vulcanization accelerator | 2 |
| Sulfur | 2 |
| Blowing agent | 2 |
| Zinc oxide | 5 |

Next, Rubber Composition-A was coated at the edges of the weatherstrip. After air dried for 30 minutes, both edges were faced to each other to adhere them. Then, a defatted treatment was subjected to the peripheral portion of the trunk opening of an automobile and the above-described weatherstrip was then mounted at the peripheral portion.

Figure 2:
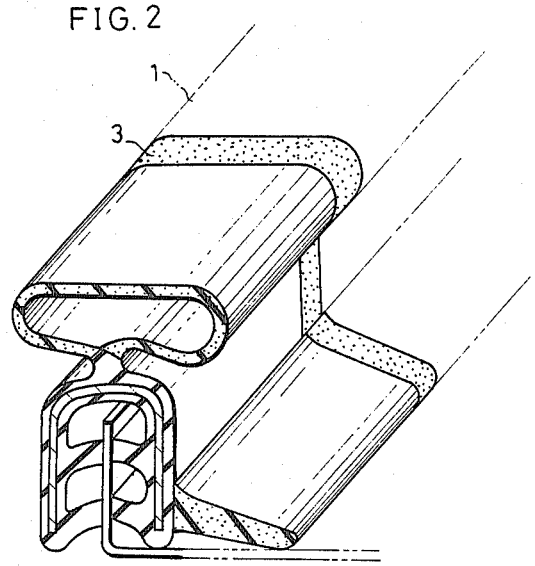

This state is shown in FIGS. 1 and 2, in which cyclic weatherstrip 1 adhered at the edges thereof with adhesive 2 comprising Rubber Composition-A is mounted at the peripheral portion of trunk opening 2.

Next, for purpose of confirming usefulness of Rubber Compositions-A to J as adhesives, a test for tensile shear strength was conducted by the following method.

Firstly, EPDM having the formulation shown in Table 10 described above was extrusion molded. After vulcanizing at 200° C. for 5 minutes, a test piece of 100 mm $\times$ 20 mm $\times$ 3 mm thick was prepared.

Then, after each surface of two test pieces was defatted, Rubber Composition-A was applied thereto. After allowing to stand for 30 minutes at room temperature, the surfaces of the two test pieces to which Rubber Composition-A was applied, respectively, were laminated so as to face the faces to each other, which was then allowed to stand overnight at room temperature. Thereafter, tensile shear strength at the laminated surfaces was examined at a speed of 30 mm/min to obtain the results shown in Table 1. Further using Rubber Compositions-B to E, a similar test for tensile shear strength was carried out. The results are also shown in Table 11.

TABLE 11

| Rubber Composition | Tensile Shear Strength (kg/cm$^2$) |
|---|---|
| A | 3.8 |
| B | 4.1 |
| C | 3.7 |
| D | 4.2 |
| E | 4.0 |

In each of the test pieces, the materials were all destroyed.

Next, a similar test for tensile shear strength was carried out using the rubber compositions of Comparative Examples 1 and 2. The results shown in Table 12 were obtained.

TABLE 12

| Adhesive | Tensile Shear Strength (kg/cm$^2$) |
|---|---|
| Comparative Example 1 | 0.5 |
| Comparative Example 2 | 0.3 |

From the test results described above, it has become evident that the adhesive forces of Rubber Compositions-A to E described above were extremely useful as adhesives for vulcanized polyolefin rubbers.

Next, examples in which Rubber Compositions-A to J were used as primers upon application of paints or adhesives for various rubber parts for automobiles will be explained below.

Door Weatherstrip:

An example of door weatherstrip for shielding crevices between a body and a door in automobile is obtained by extrusion-molding EPDM having a composition shown in Table 13 and then vulcanizing the old at 200° C. for 5 minutes.

TABLE 13

| EPDM | 100 parts |
|---|---|
| Carbon black | 80 |
| Mineral oil | 25 |
| Stearic acid | 1 |
| Vulcanization accelerator | 2 |
| Sulfur | 2 |

TABLE 13-continued

| | |
|---|---|
| Blowing agent | 2 |
| Zinc oxide | 5 |

Rubber Composition-A was applied to the surface of this base material and a urethane paint having the following composition was further applied thereto. After air-drying at room temperature for 1 hour, a 5 wt% solution of dimethyl-silicone oil (100,000 cSt) in toluene was further coated thereon.

Urethane Paint:

After the composition shown in Table 14 was reacted at 80° C. for 3 hours in a dry nitrogen gas, 24.8 parts of 1,6-hexanediol and 170 parts of dimethylformamide were added to the reaction mixture. The mixture was again reacted at 80° C. for 20 minutes in a dry nitrogen gas to prepare a paint comprising urethane prepolymer.

TABLE 14

| | |
|---|---|
| Polypropylene glycol (molecular weight = ca. 2000) | 120 parts |
| Polyethylene adipate (molecular weight = ca. 2000) | 44 parts |
| 4,4'-Diphenylmethane diisocyanate | 100 parts |
| Trichloroethylene | 264 parts |

Glass Run:

A vulcanized polyolefin rubber for glass run as an example used at portions slid with window glass of door sash is EPDM having the composition shown in Table 8 described above.

After extrusion-molding the EPDM, the EPDM was vulcanized at 160° C. for 30 minutes. Rubber Composition-B was applied to the surface of the thus obtained glass run base material. After air-drying for 1 hour, a urethane paint having the composition shown in Table 15 was applied.

TABLE 15

| | |
|---|---|
| Urethane prepolymer | 140 parts |
| Castor oil polyol (OH value = 80) | 14 parts |
| Tetrafluoroethylene resin | 32 parts |
| Silicone oil | 32 parts |
| Carbon black | 2 parts |
| Dibutyl tin dilaurate | 0.52 parts |
| Solvent | 552.8 parts |

In Table 15, the urethane prepolymer is obtained by reacting the compositions shown in Tables 16 and 17 at 80° C. for 3 hours in dry nitrogen gas, respectively, and mixing the reaction products in a ratio of 100/40 (by weight); the solvent is a solvent mixture of toluene, cyclohexanone, trichloroethane and tetrachloroethane.

TABLE 16

| | |
|---|---|
| Polyester polyol obtained from 1,4-butanediol and adipic acid (OH value = 56) | 1000 parts |
| 4,4'-Diphenylmethane diisocyanate | 100 parts |
| Toluene | 2000 parts |

TABLE 17

| | |
|---|---|
| Trimethylolpropane | 100 parts |
| 4,4'-Diphenylmethane diisocyanate | 553 parts |
| Ethyl acetate | 487 parts |

Electrostatic Flock Product:

Some of glass run is a product obtained by subjecting electrostatic flock finishing to a sliding surface with window glass with flocks.

The above-described glass run base material was dipped in Rubber Composition-C followed by allowing to stand for 30 minutes at room temperature. After the following urethane adhesive was applied to the surface thereof, piles comprising nylon-66 flocks were subjected to electrostatic flocking. The urethane adhesive was hardened by hot air to obtain an electrostatic flock product.

Urethane Adhesive:

The composition shown in Table 18 was reacted at 80° C. for 3 hours in dry nitrogen gas to obtain the urethane adhesive.

TABLE 18

| | |
|---|---|
| Polypropylene glycol (molecular weight = ca. 1000) | 100 parts |
| Ethylene glycol | 0.62 parts |
| 4,4'-Diphenylmethane diisocyanate | 100 parts |
| Toluene | 201 parts |

Next, abrasion test of the coating at the weatherstrip and the glass run to which the above-described treatment was subjected was carried out by the following method. The results shown in Table 19 were obtained.

| Abrader: | KI type abrader |
|---|---|
| Test conditions | |
| abradant: | glass (5 mm thick) |
| load | 3 kg |
| cycle of abradant: | 60/min |
| stroke of abradant: | 145 mm |

Method:

Each part of the weatherstrip and the glass run described above was mounted on a tester and the surface of the coating was abraded according to the test conditions.

TABLE 19

| | Abrasion Resistance (time) |
|---|---|
| Weatherstrip | o (50,000 times) |
| Glass run | 0 (50,000 times) | o: good abrasion resistance (no base material was exposed)

Further, abrasion test of the coating in the electrostatic flock product to which the above-described treatment was subjected was carried out by the following method.

| Abrader: | reciprocating type abrader |
|---|---|
| Test conditions | |
| abradant: | glass (5 mm thick) |
| cycle of abradant: | 60/min |
| stroke of abradant: | 145 mm |

Method:

A part of the above-described electrostatic flock product was mounted in the abrader and the surface of the coating was abraded according to the test conditions.

As a result, no exposure of the base material was noted even after repeating friction 20,000 times.

Further as comparative examples, abrasion resistance of each coating using the following various compositions used as primer for rubbers in the prior art was examined.

COMPARATIVE EXAMPLE 4

A composition obtained by dissolving "Becozol J-534" (manufactured by Dainippon Ink & Chemicals, Inc., linseed oil-modified long oil alkyd resin) in mineral base and further incorporating cobalt naphthenate as a drying agent was applied to the surface of the aforesaid glass run base material. After allowing to stand for 24 hours at room temperature, a urethane paint shown in Table 14 was applied thereto.

COMPARATIVE EXAMPLE 5

A composition obtained by dissolving "Olyster-M-55-80A" (manufactured by Mitsui Toatsu Chemical Industry Co., Ltd., moisture curing type polyurethane resin) in toluene was applied to the surface of the aforesaid glass run base material. After allowing to stand for 24 hours at room temperature, a urethane paint shown in Table 14 was applied thereto.

COMPARATIVE EXAMPLE 6

A composition obtained by dissolving "Esterresin-20" (manufactured by Toyoboseki Co., Ltd., saturated polyester) in a solvent mixture of methyl ethyl ketone/toluene=1/9 was applied to the surface of the aforesaid glass run base material. After allowing to stand for 24 hours at room temperature, a urethane paint shown in Table 14 was applied thereto.

A test for abrasion resistance with each coating in the above-described Comparative Examples 4 to 6 was carried out using the aforesaid KI type abrader and the results shown in Table 20 were obtained.

TABLE 20

|  | Abrasion Resistance (time) |
|---|---|
| Comparative Example 4 | x (150 times) |
| Comparative Example 5 | x (100 times) |
| Comparative Example 6 | x (120 times) | x: poor abrasion resistance (the base material was exposed)

An adhesive force of the coating applied to each of the above-described base materials was examined by the square test and the results shown in Table 21 were obtained.

TABLE 21

| Primer | |
|---|---|
| Rubber Composition-A | 100/100, no stripping |
| Rubber Composition-B | 100/100, no stripping |
| Rubber Composition-C | 100/100, no stripping |
| Comparative Example 4 | 0/100, poor adhesion |
| Comparative Example 5 | 0/100, poor adhesion |
| Comparative Example 6 | 0/100, poor adhesion |

Further the 180° folding test was performed to examine follow-up property of each coating obtained using Rubber Composition-A, B or C as the primer. All of them showed extremely good follow-up property and, flexibility and foldability which were both characteristic of the aforesaid weatherstrip and glass run were not damaged at all.

The rubber composition of the present invention can further be used for the following utilities.

Diaphragm:

A composition shown in Table 22 was vulcanized at 170° C. for 10 minutes to prepare a diaphragm base material comprising NBR of 60 mm$\phi$ and 1 mm thick.

TABLE 22

| NBR | 100 parts |
|---|---|
| Carbon black | 45 parts |
| Plasticizer | 25 parts |
| Stearic acid | 1 part |
| Zinc oxide | 5 parts |
| Sulfur | 2 parts |
| Vulcanization accelerator | 2 parts |

Rubber Composition-D was applied to the surface of the diaphragm base material. After allowing to stand for 30 minutes at room temperature, a urethane paint composed of polyethylene adipate (molecular weight=about 2000)/1,6-hexamethylene diisocyanate (OH/NCO=½)=200/33.6 (in a weight ratio) was applied thereto.

Next, in order to gasoline resistance of the thus treated diaphragm, the thus treated sample and a non-treated sample were both immersed in gasoline at 24° C. for 48 hours and, change in mass prior to and after the immersion was measured by the following equation:

$$\Delta W = [(W_2 - W_1)/W_1] \times 100(\%)$$

wherein $W_1$ and $W_2$ represent mass prior to and after the immersion, respectively.

As a result, $\Delta W$ of the untreated diaphragm was 30% whereas $\Delta W$ of the above-treated one was reduced to 20.1%. From the results, it has made clear that the above-described rubber composition is remarkably effective for improving the gasoline resistance of the diaphragm base material.

Blake cylinder cup:

A composition shown in Table 23 was vulcanized at 160° C. for 15 minutes to prepare a blake cylinder cup body.

Rubber Composition-E was applied to the surface of the blake cylinder cup body. After allowing to stand for 30 minutes at room temperature, the urethane paint shown in Table 14 described above was applied thereto.

TABLE 23

| SBR | 60 parts |
|---|---|
| Carbon black | 45 parts |
| Zinc oxide | 5 parts |
| Stearic acid | 1 part |
| Vulcanization accelerator | 4.6 parts |

Next, in order to examine glycol resistance of the thus treated blake cylinder cup body, the treated body and an untreated blake cylinder cup body were both immersed in commercially available lower molecular ethylene glycol at 24° C. for 200 hours. Thereafter, change in mass prior to and after the immersion was measured in a manner similar to that performed with respect to the aforesaid diaphragm.

As a result, $\Delta W$ of the untreated blake cylinder cup body was 3.5%, whereas $\Delta W$ of the treated one was reduced to 1.5%. From the results, it has become evident that the aforesaid rubber composition is markedly effective for improving the glycol resistance of the blake cylinder cup body.

Wiper blade:

After extrusion-molding EPDM having a composition shown in Table 24, the EPDM was vulcanized by heating to prepare a wiper blade.

TABLE 24

| EPDM | 100 parts |
|---|---|
| HAF Carbon black | 50 parts |
| Calcium oxide | 5 parts |
| Stearic acid | 1 part |
| Zinc oxide | 5 parts |
| Dicumyl peroxide | 4 parts |

Rubber Composition-A was applied to the surface of the thus treated wiper blade. After allowing to stand for 30 minutes at room temperature, the urethane paint shown in Table 14 described above was applied thereto.

The results indicate that the wiper blade is excellent in the follow-up property as compared to the untreated wiper blade and abrasion resistance upon sliding decreases.

From the foregoing test results, it has become apparent that the rubber composition of the present invention is extremely useful as the primer upon application of a paint or an adhesive to vulcanized polyolefin rubbers.

It is apparent to construct different embodiments over a wide range without departing from the spirit and scope of the present invention and therefore, the present invention is not deemed to be limited to specific embodiments unless they are limited by the appended claims.

What is claimed is:

1. An adhesive for a polyolefin rubber moulding, said adhesive comprising:
   (a) 100 parts by weight of an unvulcanized rubber;
   (b) 0.01 to 10 parts by weight of a halogenated isocyanuric acid, said halogenated isocyanuric acid containing in a molecule thereof of a group:

wherein X is halogen atom; and
   (c) an organic solvent to dissolve or disperse said unvulcanized rubber.

2. The adhesive as claimed in claim 1, wherein said polyolefin rubber moulding is an automobile weatherstrip.

3. An adhesive for a polyolefin rubber moulding, said adhesive comprising:
   (a) 100 parts by weight of an unvulcanized rubber;
   (b) 0.01 to 10 parts by weight of a halogenated isocyanuric acid, said halogenated isocyanuric acid containing in a molecule thereof a group:

wherein X is halogen atom;
   (c) a vulcanizing agent;
   (d) a vulcanization accelerator; and
   (e) an organic solvent to dissolve or disperse said rubber.

4. The adhesive as claimed in claim 3, wherein said polyolefin rubber moulding is an automobile weatherstrip.